Patented Dec. 1, 1953

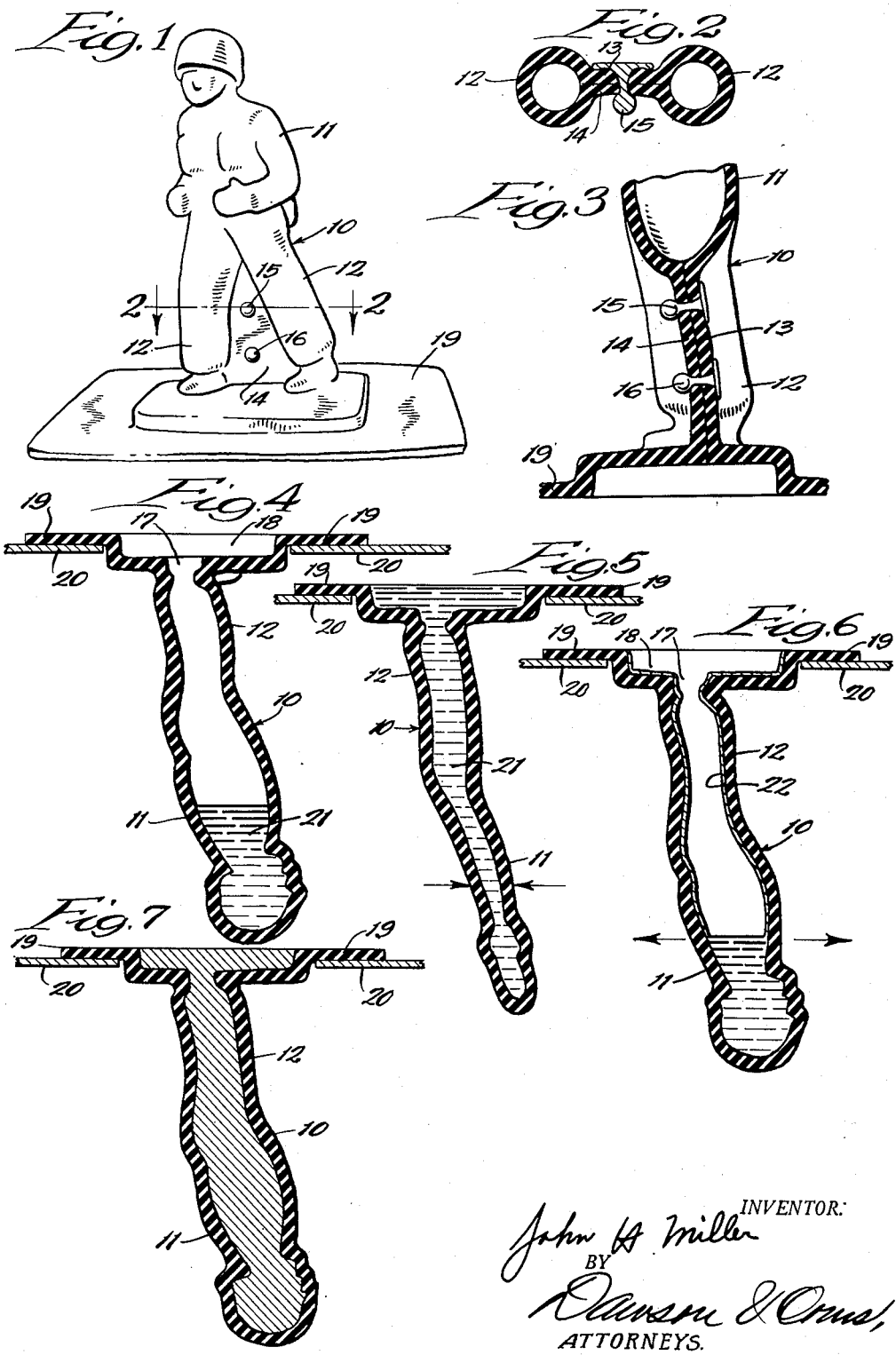

2,660,776

UNITED STATES PATENT OFFICE 2,660,776

FLEXIBLE MOLD FOR FORMING STATUES WITH SPACED LEGS

John H. Miller, La Grange, Mo.

Application December 1, 1950, Serial No. 198,631

4 Claims. (Cl. 25—118)

This invention relates to a flexible mold and molding method.

In the use of flexible molds such as molds formed from latex, etc., it is common to form a piece of statuary in which there is an enlarged portion and a narrow portion. If the larger portion of the statuary is at the inner side of the mold and the smaller portion at the outer side of the mold through which the molding material is poured, it is impossible to remove the statuary from the mold without destroying it because the larger portion of the statuary cannot be withdrawn through the narrow mold end in which the narrow portion of the statuary was formed. A further problem in the use of flexible and stretchable molds arises out of the fact that the molding material, such as plaster of Paris, when poured into the mold, tends to bulge the mold at certain points and the resulting figure is inaccurately molded.

An object of the present invention is to provide a flexible mold which securely presents sealed surfaces for the reception of the molding material while at the same time permitting the mold to be enlarged about the narrow point of the mold for the ready release of the statuary even when the enlarged portion of the statuary is within the closed end of the mold. Yet another object is to provide a one-piece mold which is effectively employed for the molding of statuary having an enlarged portion in the closed end thereof and a narrowed, or a plurality of narrowed, portions in the open end thereof, the mold being releasably secured for the molding of the narrow portions while being readily opened for the removal of the entire statuary intact after the molding operation. A still further object is to provide a method and means for molding statuary in single piece molds while effecting their ready release after the molding operation. A still further object is to provide a method for the molding of statuary and the like while employing stretchable or elastic molds and while preventing the bulging of the mold under the weight of the material. A still further object is to provide a molding method in which relatively thin and stretchable mold material is molded while preventing distortion or inaccurate molding of the object because of the weight of the material poured into the mold. Other specific objects and advantages will appear as the specification proceeds.

The invention is shown in an illustrative embodiment, by the accompanying drawing, in which—

Figure 1 is a perspective view of a mold formed of flexible material and embodying my invention; Fig. 2, a transverse sectional view, the section being taken at line 2—2 of Fig. 1; Fig. 3, an enlarged broken vertical sectional view; Fig. 4, a vertical sectional view of the mold shown in supported position for pouring; Fig. 5, a view similar to Fig. 4 but illustrating a method step for the forming of a coating on the inner side of the mold to stiffen the mold; Fig. 6, a view similar to Fig. 5 showing the mold provided with the stiffening lining; and Fig. 7, a view similar to Fig. 1 but showing the mold as finally filled.

In the illustration given, 10 designates a one-piece mold formed of latex or other suitable resilient or flexible material. The mold is formed in one piece and provides an upper hollow body portion 11 for the soldier illustrated, and two spaced leg portions 12 therebelow. Between the two spaced leg portions 12 the mold is provided with spaced walls 13 and 14 which are formed integrally with the walls extending about the legs 12 and are continuous therewith. I employ buttons 15 and 16 which extend through the walls 13 and 14 to releasably secure them together. The hollow leg portions 12 merge through the opening 17 with the base opening 18, as shown more clearly in Fig. 4. The walls of the mold are extended laterally to form flanges 19 which rest upon a plate support 20.

In actual operation, it will be understood that the plate 20 is provided with a large number of openings through which molds such as 10 are extended and with the flange portions 19 resting upon the body of the plate 20. In this position, the molds are ready to receive the material which is to be molded such as, for example, plaster of Paris.

Ordinarily, in molding a statue in which there are portions of relatively narrow cross-section such as the legs 12, and portions of relatively large cross-section such as the portion 11, it is necessary to use divided molds, because after the material is poured through the leg portions 12, as illustrated in Fig. 4, the resulting object cannot be removed from the mold. I have discovered that a single piece mold can be employed and that the leg portions 12 may be effectively molded with the structure illustrated while, after the molding operation, the entire figure can be withdrawn intact by unbuttoning the walls 13 and 14 and providing thus an enlarged channel through which the enlarged body portion of the object can be readily withdrawn. By the use of the resilient molding material and the buttons 15 and 16 which tightly hold these walls together in sealing relation, there is no spillage of the liquid as it is passed into the molds and an accurate statue is obtained. At the same time, the ball portion of the button can be easily drawn through the slit opening in the wall 14 to separate the walls while at the same time the button is held in position within the wall 13 for re-use in locking the walls together when the mold is to be used in the next operation.

In the molding operation where latex and similar resilient material is employed, a large number of failures have been caused by the tendency of the material to bulge or stretch under the weight of the molding liquid. The resulting figure loses its sharpness and the features are often distorted. I have discovered that extremely sharp molding operations can be carried out while employing very thin and stretchable molding material through the use of the following method: I pour into the mold, as illustrated in Fig. 4, a relatively small amount of the plaster of Paris, as, for example, about one-third of the required amount. I then press or squeeze the walls of the mold together, as illustrated in Fig. 5, to cause the liquid to flow upwardly through the constricted openings of the mold and thus to form a lining adhering to the walls of the mold. The small amount of liquid described, indicated in Figs. 4 and 5 by the numeral 21, and the resulting lining along the walls of the mold is indicated by the numeral 22. By reason of the thinness of the layer, the lining 22 quickly solidifies, forming a stiffening liner conforming to the walls of the mold. Thereupon, the remainder of the liquid required for filling the mold is added to produce the result shown in Fig. 7. Stretching or bulging does not occur due to the stiffening effect of the liner 22, and the liquid filling the mold solidifies in about 15 minutes or so to form the desired statue. It is found that the statue thus produced accurately conforms to the mold in every small detail and there is no distortion or bulging of the statue at any point.

In the structure shown, I have set out a single statue in which a soldier is represented with the releasably connected walls 13 and 14 extending between his legs. It will be understood that the statue may consist of a great variety of objects and the walls 13 and 14 which are releasably connected may extend about any portion of the mold which is to form the statue portion of reduced cross-section at the side where the molding liquid is to be poured into the mold. Thus, whatever the configuration of the mold, the portion of the mold toward the pouring end can be quickly enlarged after the molding operation to free the object therefrom. Instead of the buttons illustrated, snap fasteners or other releasable fastening devices may be used.

The squeezing of the mold is effective in removing air bubbles and thus causing the molding liquid to fill accurately the lower portion of the mold while at the same time it brings about an application of the molding liquid over the entire upper surfaces of the mold. This coating or film, because of its thinness, quickly dries and stiffens the wall so that the remainder of the liquid required to fill the mold may be poured into the mold without causing a distortion or bulging of the mold walls. It will be understood, however, that such forming of the film along the sides of the mold may be accomplished in different ways while still utilizing my invention.

While in the foregoing specification, I have shown a single structure in considerable detail for the purpose of illustrating an embodiment of the invention, it will be understood that such details of structure and steps may be varied widely by those skilled in the art without departing from the spirit of my invention.

I claim:

1. In a flexible mold structure, a hollow mold formed of resilient material adapted to form a statue with legs in spaced relation, the leg portions of said mold being open to receive molding liquid when the mold is inverted, said mold having separate wall portions extending between the legs of said mold and releasably held together, said walls between the legs of said mold being separable after the forming of the statue to enlarge said end of the mold to permit the removal of the statue therethrough.

2. In a flexible mold structure an integral hollow mold formed of resilient material arranged to form a statue with legs in spaced relation, the leg portions of said mold being open to receive molding liquid when the mold is inverted, said mold having separate wall portions extending between the legs of said mold and releasably held together by fastening elements, said walls between the legs of the mold being separable after the forming of the statue to enlarge said end of the mold to permit the removal of the statue therethrough.

3. In a flexible mold structure, a hollow mold formed of resilient material adapted to form a statue in the shape of a man with the legs thereof in spaced relation, the leg portions of said mold being open to receive molding liquid when the mold is inverted, said mold having wall portions extending freely between the legs of said mold and releasably held together by fastening elements, said walls between the legs of the mold being separable after the forming of the statue to enlarge said end of the mold to permit the removal of the statue therethrough.

4. In a flexible mold, a resilient hollow mold having a closed end and an open end for the receiving of molding fluid when the mold is inverted, said mold having wall portions adjacent a reduced portion of the mold extended laterally and apertured, a flange-equipped button having a shank extending through said apertures and a ball end engaging the outer side of the wall opposite the wall engaged by said flange for releasably confining the said walls together; said mold being provided near its open end portion with laterally extending flanges engageable with the support for supporting the mold in inverted position.

JOHN H. MILLER.

References Cited in the file of this patent

UNITED STATES PATENTS

| Number | Name | Date |
|---|---|---|
| 748,996 | Spencer | Jan. 5, 1904 |
| 1,562,520 | Ruppel | Nov. 24, 1925 |
| 2,052,818 | Freyssinet et al. | Sept. 1, 1936 |
| 2,124,871 | Beal | July 26, 1938 |
| 2,196,258 | Erdle | Apr. 9, 1940 |
| 2,349,806 | Bean | May 30, 1944 |
| 2,352,083 | Detjen | June 20, 1944 |
| 2,439,724 | Finley | Apr. 13, 1948 |